(12) United States Patent
Hezel et al.

(10) Patent No.: US 7,174,882 B2
(45) Date of Patent: Feb. 13, 2007

(54) PRESSURE REGULATING VALVE

(75) Inventors: Bruno Hezel, Stuttgart (DE); Markus Christen, Bochum (DE); Markus Ulrich, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 15 days.

(21) Appl. No.: 11/103,810

(22) Filed: Apr. 12, 2005

(65) Prior Publication Data
US 2005/0247354 A1    Nov. 10, 2005

(30) Foreign Application Priority Data
May 6, 2004    (DE) .................... 10 2004 022 275

(51) Int. Cl.
*F16K 7/12*    (2006.01)
(52) U.S. Cl. ..................... 123/574; 251/331
(58) Field of Classification Search ............... 123/574; 251/331, 337; 137/526, 859, 907, 536, 537
See application file for complete search history.

(56) References Cited

U.S. PATENT DOCUMENTS

| 3,678,910 | A | * | 7/1972 | Marlett ........................ 123/574 |
| 4,488,370 | A |   | 12/1984 | Lemelson |
| 4,856,487 | A | * | 8/1989 | Furuya ......................... 123/574 |
| 5,090,393 | A | * | 2/1992 | Holch .......................... 123/574 |
| 6,095,496 | A | * | 8/2000 | Rydin et al. ................. 251/331 |
| 6,116,576 | A | * | 9/2000 | Hoglund et al. ............. 251/331 |
| 6,651,636 | B1 | * | 11/2003 | Albright ...................... 123/574 |
| 2004/0041119 | A1 | * | 3/2004 | Christen et al. ............ 251/331 |
| 2005/0211232 | A1 | * | 9/2005 | Dushek et al. .............. 123/574 |

FOREIGN PATENT DOCUMENTS

| DE | 195 07 202 A1 | 10/1995 |
| EP | 0 177 301 A2 | 9/1985 |
| EP | 0 674 973 A1 | 10/1995 |
| WO | 97/26471 | 7/1997 |

* cited by examiner

*Primary Examiner*—Marguerite McMahon
(74) *Attorney, Agent, or Firm*—Michael J. Striker

(57) ABSTRACT

Known pressure regulating valves have a valve closing body, which cooperates with a valve seat, and a restoring spring, which acts on a valve closing body in the direction facing away from the valve seat. It is disadvantageous that the restoring spring is disposed in a pressure chamber, which has the valve seat and through which aggressive blowby gases flow out of the crankcase. The blowby gases for instance have a corrosive, etching effect on the material of the restoring spring, shortening the service life and lessening the spring force of the restoring spring. This has a highly adverse effect on the regulation of the pressure in the crankcase. In the pressure regulating valve of the invention, the service life of the restoring spring is increased. According to the invention, the restoring spring (31) is embodied as a tension spring and is located on the side of the valve closing body (15) facing away from the valve seat (12).

6 Claims, 4 Drawing Sheets

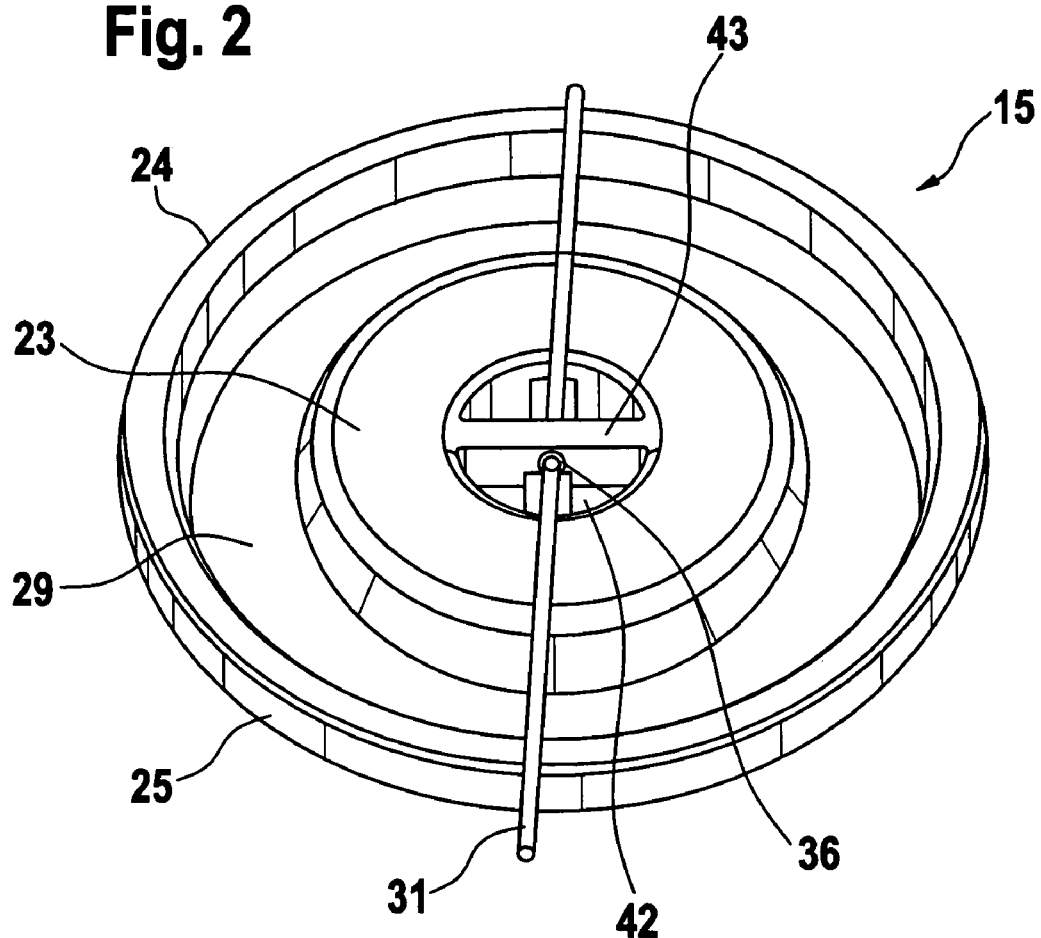

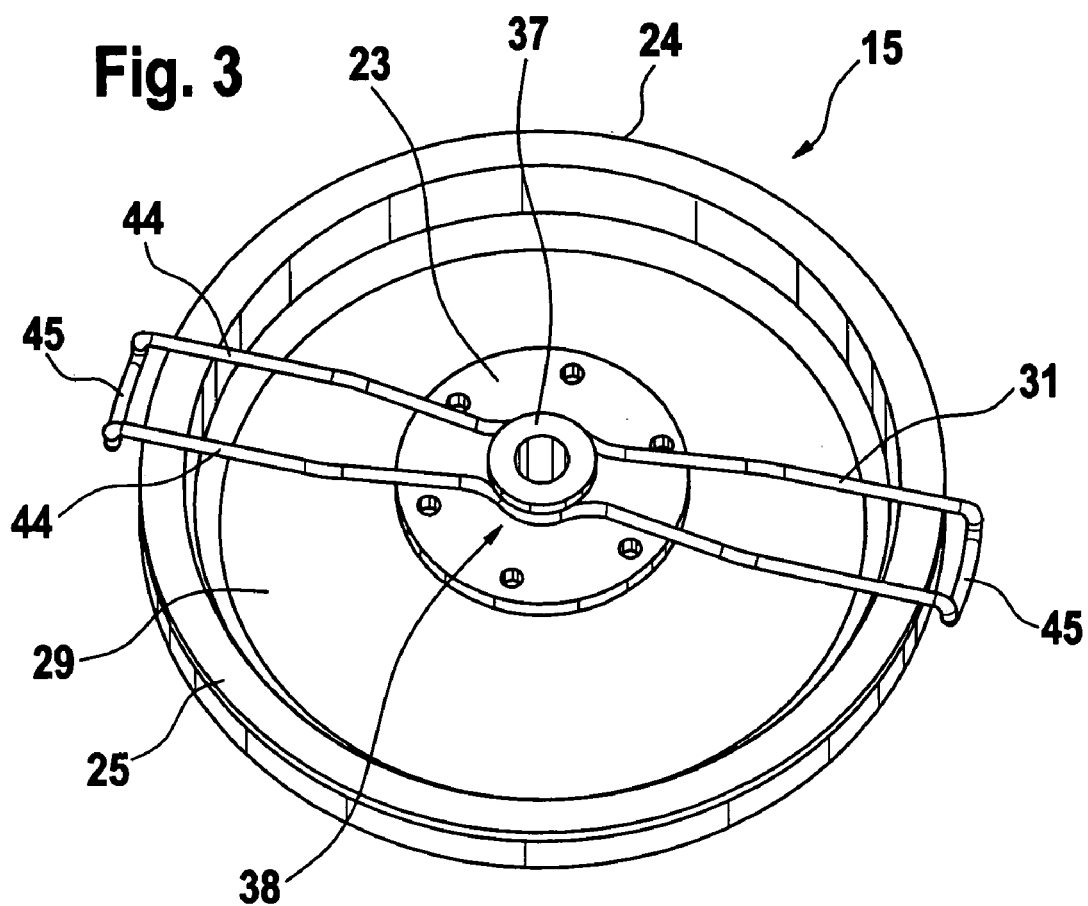

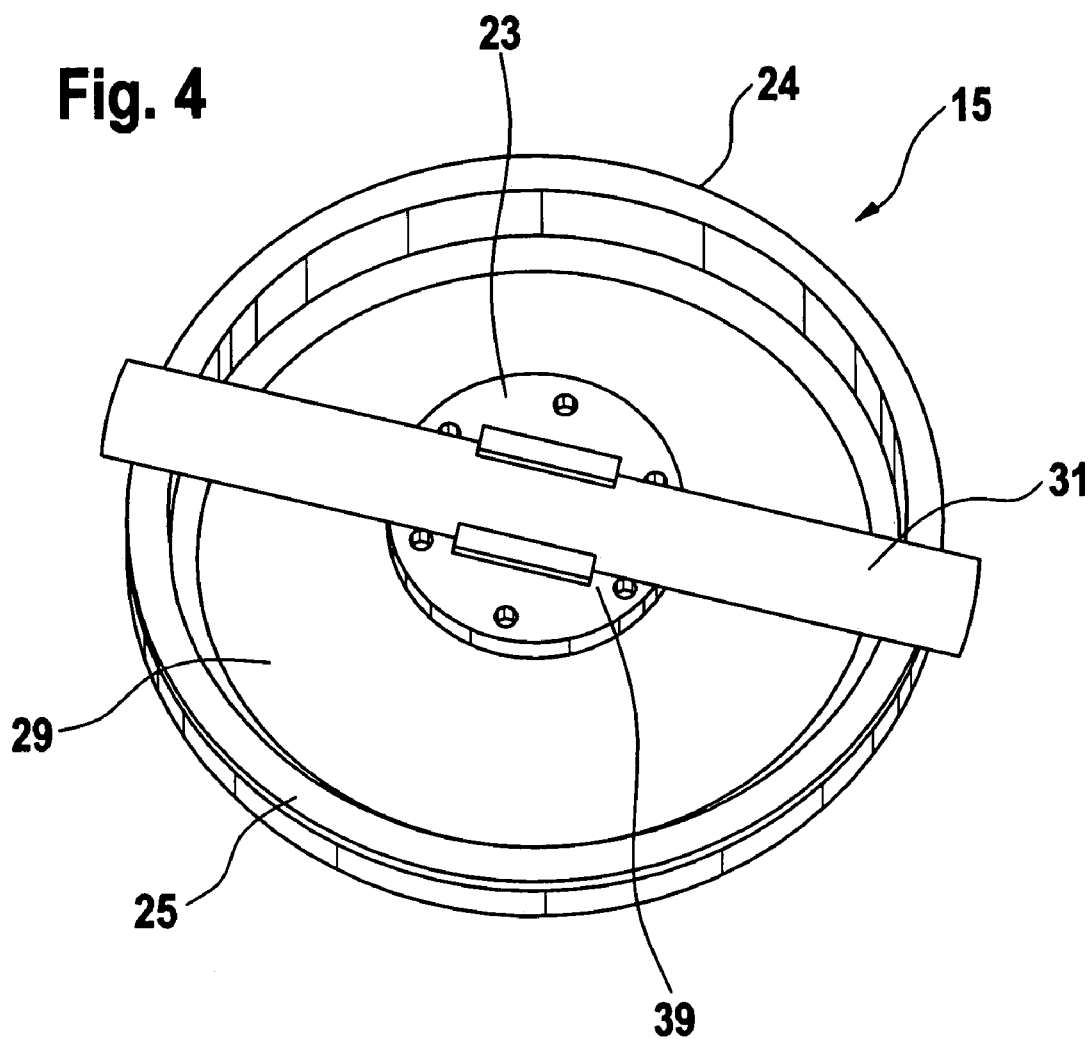

PRESSURE REGULATING VALVE

CROSS-REFERENCE

The invention described and claimed hereinbelow is also described in DE 10 2004 022275.4 filed May 6, 2004. This German Patent Application, whose subject matter is incorporated here by reference, provides the basis for a claim of priority of invention under 35 U.S.C. 119 (a)–(d).

BACKGROUND OF THE INVENTION

The invention is based on a pressure regulating valve.

A pressure regulating valve is already known from German Patent DE 195 07 202 C2, having a valve closing body, which cooperates with a valve seat, and a restoring spring, which acts on a valve closing body in the direction facing away from the valve seat. It is disadvantageous that the restoring spring is disposed in a pressure chamber, which has the valve seat and through which aggressive blowby gases flow out of the crankcase. The blowby gases for instance have a corrosive, etching effect on the material of the restoring spring, shortening the service life and lessening the spring force of the restoring spring. This has a highly adverse effect on the regulation of the pressure in the crankcase.

SUMMARY OF THE INVENTION

The pressure regulating valve of the invention, having the definitive characteristics of the main claim, has the advantage over the prior art that in a simple way, an improvement is attained such that the service life of the restoring spring is increased and the spring force is kept constant, because the restoring spring is embodied as a tension spring and is located on the side of the valve closing body facing away from the valve seat.

In this way, the restoring spring is no longer exposed to the aggressive gases.

By the provisions recited in the dependent claims, advantageous refinements of and improvements to the pressure regulating valve defined by the main claim are possible.

It is especially advantageous if the restoring spring is embodied as a leaf spring, which is made from a flat steel or a wirelike round steel, because these are very economical, space-saving embodiments.

It is also advantageous if the valve closing body is embodied as a diaphragm, and the diaphragm has a valve closing portion, cooperating with the valve seat; a collar, provided on an edge of a diaphragm; and at least one crease of the diaphragm between the valve closing portion and the edge of the diaphragm. A pressure regulating valve embodied in this way is especially economical, since no further measures for guiding the valve closing body are necessary.

It is highly advantageous if the valve housing has a valve pot and a valve cap, and the valve closing body is fastened to the edge of the diaphragm between the valve pot and the valve cap.

It is also advantageous if the restoring spring rests loosely on the edge of the diaphragm and is supported in a recess of the valve cap.

In an advantageous feature, in the valve housing a valve interior is provided, which is divided by the valve closing body into a pressure chamber that has the valve seat and a ventilation chamber communicating with the atmosphere, and the restoring spring is disposed in the ventilation chamber.

It is furthermore advantageous if the restoring spring extends from the edge of the diaphragm to the diametrically opposite edge of the diaphragm, since in this way the restoring spring can be supported very simply.

It is also advantageous if the restoring spring is connected in material-, force- or form-locking fashion to the valve closing body in the region of a valve axis, since in this way the restoring spring can act on the valve closing body in the direction facing away from the valve seat.

BRIEF DECRIPTION OF THE DRAWINGS

Exemplary embodiments of the invention are shown in simplified form in the drawing and described in further detail in the ensuing description.

FIG. 1 in section shows an elevation view of the pressure regulating valve of the invention.

FIG. 2 shows a first exemplary embodiment.

FIG. 3 shows a second exemplary embodiment.

FIG. 4 shows a third exemplary embodiment of the restoring spring of the invention.

DETAILED DESCRIPTION OF THE PREFERRED EMBODIMENTS

Figure 1:
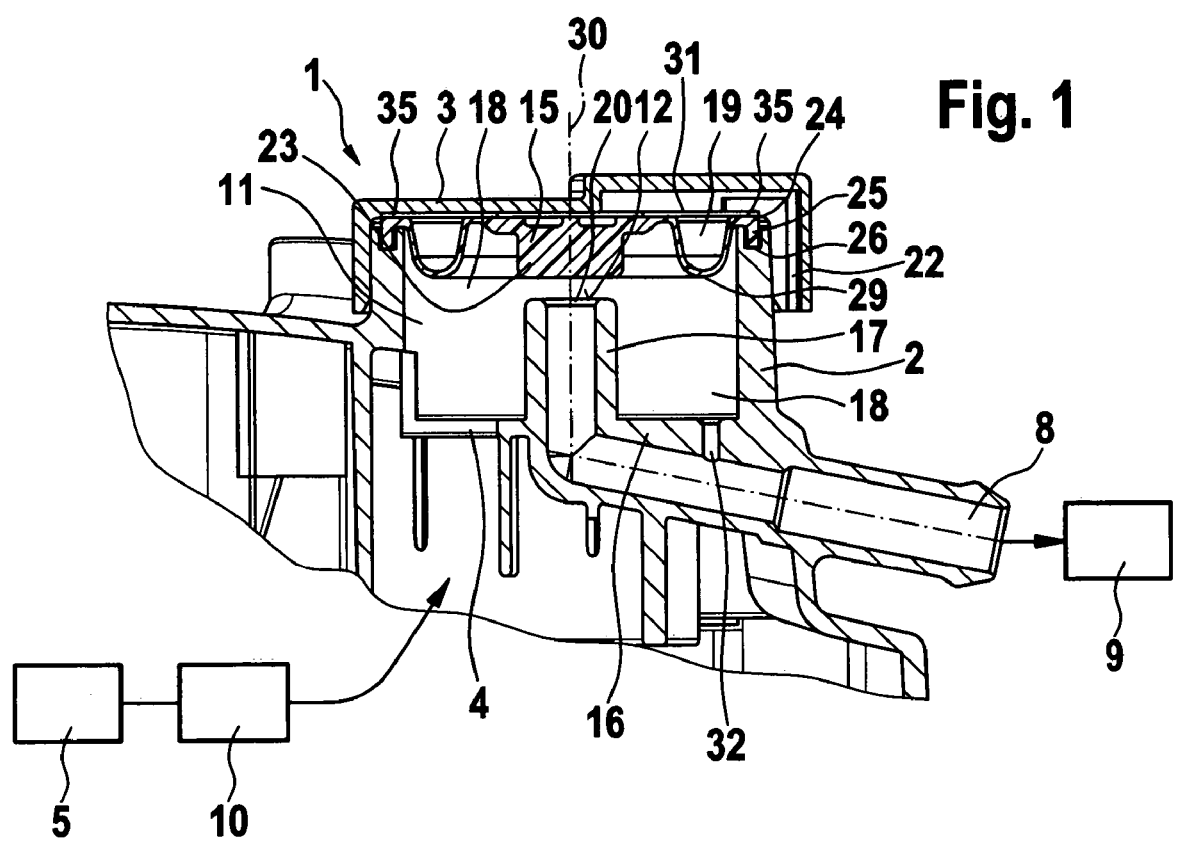

FIG. 1 shows a pressure regulating valve of the invention.

The pressure regulating valve of the invention is preferably employed in a crankcase venting system, for regulating a pressure in a crankcase to a constant value that is predetermined by the spring force of a restoring spring. However, it is also expressly possible for the pressure regulating valve to be used in other areas for pressure regulation.

During operation of an internal combustion engine, so-called blowby gas flows out of a combustion chamber into a crankcase, because of a slight leakage between the piston, piston rings, and cylinder running faces. For this blowby gas, the general term "gas" will also simply be used. Because of the slight leakage of gas from the combustion chamber of the engine, an impermissible increase in pressure occurs in the crankcase, making it necessary to achieve a pressure equilibrium by so-called crankcase venting. Since the gas has a high hydrocarbon concentration, the gas is carried by the crankcase venting not into the atmosphere but rather into an intake tube of the engine, so that from there it is delivered to combustion. The gas delivered to the intake tube has an oil fog with many large and small oil droplets, which occurs because of the gas flowing at high velocity into the crankcase and because of the moving parts in the crankcase. The oil droplets in the oil fog must be precipitated out of the gas stream, with the aid of a device for filtering out liquid, before being introduced into the intake tube, for the sake of avoiding a high oil loss and in order not to adversely affect combustion.

The pressure regulating valve has a valve housing 1 with a valve pot 2 and a valve cap 3 that closes the valve pot 2.

The valve housing 1 has at least one inlet conduit 4, which communicates for instance with a crankcase 5 of an internal combustion engine, and at least one outlet conduit 8, which communicates for instance with an intake tube 9 of the engine. Between the crankcase 5 and the pressure regulating valve of the invention, a separator device 10, for instance, is provided for precipitating out oil droplets.

The valve housing 1 has a valve interior 11, defined by the valve pot 2 and the valve cap 3, in which a valve closing body 15 that cooperates with a valve seat 12 is provided. A stub 17 protruding into the valve interior 11 is for instance located on a valve bottom 16 of the valve pot 2. The outlet conduit 8 extends through the stub 17 and discharges into the valve interior 11 via a valve seat opening 20 that forms the valve seat 12 and is provided on a face end of the stub 17 oriented toward the valve closing body 15. The valve closing body 15 is for instance located axially movably between the valve seat 12 and the valve cap 3 and divides the valve interior 11 into a pressure chamber 18 that has the valve seat 12 and a ventilation chamber 19 communicating with a reference pressure. The ventilation chamber 19, for instance via a ventilating conduit 22 provided in the valve cap 3, communicates with the atmosphere, but may also communicate with some other reference pressure.

The valve closing body 15 is embodied for instance as a diaphragm, which has a valve closing portion 23 that cooperates with the valve seat 12. The diaphragm extends radially outward from the valve closing portion 23 and is fastened at an annular edge 24 of the diaphragm between the face end of the valve pot 2 facing away from the pot bottom 16 and the valve cap 3. On the edge 24 of the diaphragm, an annular collar 25 is for instance provided, which protrudes into an annular groove 26 located on the face end of the valve pot 2 facing away from the pot bottom 16. Between the edge 24 of the diaphragm and the valve closing portion 23, at least one crease 29 of the diaphragm is provided, which makes the axial movability of the valve closing portion 23 in the direction of a valve axis 30 possible. The wall thickness of the valve closing portion 23 is greater for instance than that of the at least one crease 29 of the diaphragm and the collar 25. The valve closing portion 23 is embodied cylindrically, for instance, and the wall thickness of the diaphragm 15 decreases either in stages and/or continuously at the transition from the valve closing portion 23 to the at least one crease 29 of the diaphragm.

The valve closing portion 23 is manufactured from an elastomer, a metal, or a plastic, for instance, and the remaining diaphragm with the at least one crease 29 of the diaphragm and the collar 25 is manufactured from an elastomer or plastic.

A restoring force of a restoring spring 31 acts on the valve closing body 15 in the direction facing away from the valve seat 12.

According to the invention, the restoring spring 31 is embodied as a tension spring, which pulls the valve closing body 15 in the direction facing away from the valve seat 12.

The restoring spring 31 is located on the side of the valve closing body 15 facing away from the valve seat 12, for instance in the ventilation chamber 19. In the ventilation chamber 19, the restoring spring 31 is located between the edge 24 of the diaphragm 15 and the valve cap 3; beginning at the edge 24 of the diaphragm, it extends toward the diametrically opposite edge 24 of the diaphragm and rests loosely on each edge 24 of the diaphragm and is supported for instance on both of its ends in a respective recess 35 of the valve cap 3. The recesses 35 in the valve cap 3 are each located in the region of the annular edge 24 of the diaphragm. In the region of the valve axis 30, the restoring spring 31 is connected in form-locking, material-locking or force-locking fashion to the valve closing body 15, for instance to the valve closing portion 23.

The restoring spring 31 of the invention is for instance a leaf spring or a barlike spring, which is made from a flat steel or wire-shaped round steel and is manufactured from spring steel.

Upon the axial motion of the valve closing body 15 in the direction of the valve seat 12, the restoring spring 31 is made to sag. The sagging of the barlike restoring spring 31 is made possible because the two ends of the restoring spring 31 are not fixedly fastened but instead rest loosely on the edge 24 of the diaphragm and are each capable of moving freely radially inward, relative to the valve axis 30, in the recess 35 in the valve cap 3. The recesses 35 allow no or only slight lateral motion of the restoring spring 31 transversely to the length of the restoring spring 31.

When the pressure regulating valve is open, a pressure predetermined by the pressure in the intake tube 9 and the pressure in the crankcase 5 is established, which is for instance an underpressure and acts on the face of the diaphragm 15 oriented toward the pressure chamber 18.

When the pressure regulating valve is closed, a pressure that is predetermined only by the pressure in the crankcase 5 is established in the pressure chamber 18; this is for instance a very sight overpressure and it acts on the face of the diaphragm 15 oriented toward the pressure chamber 18, minus the surface area covered by the stub 17.

At the diaphragm 15, a force equilibrium is established, in which both a restoring force of the restoring spring 31 and a force that results from the difference in pressure between the pressure of the pressure chamber 18 and the pressure of the ventilation chamber 19 are involved.

When the pressure regulating valve is closed, an aspiration force is additionally involved, which results from the underpressure prevailing in the intake tube 9 and acting on the face of the valve closing body 15 that is covered by the valve seat opening 20.

As a function of the force equilibrium, a predetermined opening spacing is established between the valve closing body 15 and the valve seat 12. The smaller the opening spacing is, the less blowby gas volume can flow per unit of time into the intake tube 9.

The spring force of the restoring spring 31 is designed such that the pressure regulating valve closes in a safety position whenever the underpressure in the intake tube 9 exceeds a predetermined value. This prevents the crankcase 5 from being sucked empty by an excessively great underpressure. The pressure that is established in the crankcase 5 is determined by the design of the spring force of the restoring spring 31. Between the pressure chamber 18 and the outlet conduit 8, a throttling bypass conduit 32 may be provided, which even when the pressure regulating valve is closed allows a minimum flow to flow out of the crankcase 5 into the intake tube 9.

FIG. 2 shows a first exemplary embodiment of the restoring spring of the invention.

In the pressure regulating valve of FIG. 2, those parts that remain the same or function the same as in the pressure regulating valve of FIG. 1 are identified by the same reference numerals.

In the first exemplary embodiment, the restoring spring 31 is a straight round wire, which extends from one edge 24 of the diaphragm to the diametrically opposite edge 24 of the diaphragm and is guided in the region of the valve axis 30 by a through opening 36 in the valve closing portion 23 and in this way is coupled mechanically to the valve closing body 15.

In the region of the valve axis 30, the valve closing portion 23, on the side toward the ventilation chamber 19, has for instance a circular indentation 42, in which a crossbar 43 is located that extends from one edge of the indentation 42 to a diametrically opposite edge of the indentation 42. The crossbar 43 protrudes for instance out of the indentation 42 in the direction of the valve cap 3. The through opening 36 through which the restoring spring 31 protrudes is provided in the portion of the crossbar 43 that protrudes outward.

On its ends, the restoring spring 31 is loosely supported.

FIG. 3 shows a second exemplary embodiment of the restoring spring of the invention.

In the pressure regulating valve of FIG. 3, those parts that remain the same or function the same as in the pressure regulating valve of FIG. 1 and FIG. 2 are identified by the same reference numerals.

In the second exemplary embodiment, the restoring spring 31 is embodied as a barlike spring, which is shaped from a round wire in such a way that the two ends of the round wire are joined together or at least adjacent to one another, and in this way two legs 44 extending in the same direction, for instance, are formed, which extend from one edge 24 of the diaphragm to the diametrically opposite edge 24 of the diaphragm and are joined together via two crosswise legs 45. On both of its ends, the restoring spring 31 protrudes past the respective edge 24 of the diaphragm and in each case engages the edge 24 of the diaphragm from behind because the ends are bent at an angle.

In the region of the valve axis 30, on the side of the valve closing portion 23 toward the ventilation chamber 19, there is a cylindrical shoulder 37, which has an annular groove 38. The restoring spring 31 is joined in form-locking fashion to the valve closing portion 23 in such a way that the two legs 44 extend in some portions through the annular groove 38. For instance, the legs 44 enter the annular groove 38 approximately at a tangent, then in a portion corresponding to the annular groove 38 are bent into part of a ring, and then emerge from the annular groove 38 again approximately at a tangent.

FIG. 4 shows a third exemplary embodiment of the restoring spring of the invention.

In the pressure regulating valve of FIG. 4, those parts that remain the same or function the same as in the pressure regulating valve of FIGS. 1 through 3 are identified by the same reference numerals.

In the third exemplary embodiment, the restoring spring 31 is embodied as a leaf spring, which is made from a flat steel. On both ends, the restoring spring 31 protrudes past the respective edge 24 of the diaphragm. The form locking of the restoring spring 31 to the valve closing portion 23 is achieved by providing that the valve closing portion 23, on the side toward the ventilation chamber 19, has a T-shaped groove 39, through which the restoring spring 31 is guided.

What is claimed is:

1. A pressure regulating valve, having a valve closing body which cooperates with a valve seat, and having a restoring spring which acts on the valve closing body in the direction facing away from the valve seat, characterized in that the restoring spring (31) is embodied as a tension spring and is located on the side of the valve closing body (15) facing away from the valve seat (12), wherein the valve closing body (15) is embodied as a diaphragm having an edge (24), wherein the restoring spring (31) extends from the edge (24) of the diaphragm to a diametrically opposite (24) edge of the diaphragm, wherein the valve housing (1) has a valve interior (11), which is divided by the valve closing body (15) into a pressure chamber (18) that has the valve seat (12) and a ventilation chamber (19) communicating with the atmosphere, and wherein the restoring spring (31) is disposed in the ventilation chamber (19).

2. The pressure regulating valve as recited in claim 1, wherein the restoring spring (31) is embodied as a leaf spring, which is made from a flat steel or a wirelike round steel.

3. The pressure regulating valve as recited in claim 1, wherein the valve closing body (15) has a valve closing portion (23), cooperating with the valve seat (12); a collar (25), provided on the edge (24) of the diaphragm ; and at least one crease (29) of the diaphragm between the valve closing portion (23) and the edge (24) of the diaphragm.

4. The pressure regulating valve as recited in claim 3, wherein the valve housing (1) has a valve pot (2) and a valve cap (3) and the valve closing body (15) is fastened to the edge (24) of the diaphragm between the valve pot (2) and the valve cap (3).

5. The pressure regulating valve as recited in claim 3, wherein the restoring spring (31) rests loosely on each edge (24) of the diaphragm and is supported in a recess (35) of the valve cap (3).

6. The pressure regulating valve as recited in claim 1, wherein the restoring spring (31) is connected in material-, force- or form-locking fashion to the valve closing body (15) in the region of a valve axis (30).

* * * * *